(12) United States Patent
Branch et al.

(10) Patent No.: US 9,094,309 B2
(45) Date of Patent: Jul. 28, 2015

(54) DETECTING TRANSPARENT NETWORK COMMUNICATION INTERCEPTION APPLIANCES

(75) Inventors: Joel W. Branch, Hamden, CT (US); Michael E. Nidd, Zurich (CH); Ruediger Rissmann, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 13/418,761

(22) Filed: Mar. 13, 2012

(65) Prior Publication Data
US 2013/0246606 A1 Sep. 19, 2013

(51) Int. Cl.
*H04L 12/24* (2006.01)
*H04L 12/751* (2013.01)
*H04L 12/733* (2013.01)
*H04L 12/26* (2006.01)

(52) U.S. Cl.
CPC ............ *H04L 41/0853* (2013.01); *H04L 41/12* (2013.01); *H04L 43/12* (2013.01)

(58) Field of Classification Search
CPC .............. H04L 29/08072; H04L 29/06; H04L 29/08144
See application file for complete search history.

(56) References Cited

U.S. PATENT DOCUMENTS

| | | | |
|---|---|---|---|
| 5,495,426 A * | 2/1996 | Waclawsky et al. | 709/226 |
| 6,085,224 A * | 7/2000 | Wagner | 709/203 |
| 6,219,786 B1 | 4/2001 | Cunningham et al. | |
| 6,556,541 B1 * | 4/2003 | Bare | 370/235 |
| 7,426,577 B2 | 9/2008 | Bardzil et al. | |
| 7,558,261 B2 | 7/2009 | Arregoces et al. | |
| 7,724,659 B2 | 5/2010 | Tsumura | |
| 8,073,952 B2 | 12/2011 | Yoo et al. | |
| 8,510,548 B1 * | 8/2013 | Markov et al. | 713/150 |
| 2002/0181439 A1 * | 12/2002 | Orihashi et al. | 370/350 |
| 2004/0133640 A1 | 7/2004 | Yeager et al. | |

(Continued)

FOREIGN PATENT DOCUMENTS

JP 2007180859 A 7/2007

OTHER PUBLICATIONS

International Search Report and Written Opinion dated May 20, 2013 for International Application No. PCT/US2013/029756, 12 pages.
"HTTP Load Balancer Detector", www.superadditive.com, http://halberd.superadditive.com, accessed on Mar. 9, 2012, 2 pages.

(Continued)

*Primary Examiner* — Ramy M Osman
*Assistant Examiner* — Ho Shiu
(74) *Attorney, Agent, or Firm* — Francis Lammes; Stephen J. Walder, Jr.; Louis J. Percello (57) ABSTRACT

Mechanisms are provided for identifying transparent network communication interception appliances in a network topology. The mechanisms collect network configuration data from a plurality of devices in the network topology and analyze the collected network configuration data using one or more heuristics to identify patterns in the collected network configuration data indicative of the presence of a transparent network communication interception appliance. The mechanisms calculate a confidence measure value based on results of the analysis of the collected network configuration data. The mechanisms further send a notification of a detected presence of a transparent network communication interception appliance to a computing device in response to the calculated confidence measure value meeting or exceeding at least one threshold value.

23 Claims, 4 Drawing Sheets

(56) References Cited

U.S. PATENT DOCUMENTS

| | | | |
|---|---|---|---|
| 2004/0260755 A1* | 12/2004 | Bardzil et al. | 709/200 |
| 2005/0240835 A1* | 10/2005 | Dragnea et al. | 714/47 |
| 2006/0125847 A1 | 6/2006 | Andreev et al. | |
| 2007/0008972 A1* | 1/2007 | Sifnatsch et al. | 370/392 |
| 2007/0014233 A1 | 1/2007 | Oguro et al. | |
| 2007/0143454 A1 | 6/2007 | Ma et al. | |
| 2008/0148378 A1 | 6/2008 | Wing et al. | |
| 2008/0205388 A1* | 8/2008 | Colville et al. | 370/389 |
| 2008/0239976 A1* | 10/2008 | Altman | 370/252 |
| 2009/0016238 A1 | 1/2009 | Yu | |
| 2009/0157866 A1* | 6/2009 | Sridharan et al. | 709/224 |
| 2010/0011061 A1* | 1/2010 | Hudson et al. | 709/204 |
| 2010/0058451 A1* | 3/2010 | Paramasivam et al. | 726/7 |
| 2010/0174731 A1 | 7/2010 | Vermeulen et al. | |
| 2010/0185764 A1* | 7/2010 | Kondo et al. | 709/225 |
| 2010/0218254 A1 | 8/2010 | Gray, II et al. | |
| 2011/0246647 A1* | 10/2011 | Marquezan et al. | 709/224 |
| 2011/0252281 A1* | 10/2011 | Sridharan et al. | 714/48 |
| 2011/0289206 A1* | 11/2011 | Vecera et al. | 709/224 |
| 2011/0313856 A1* | 12/2011 | Cohen et al. | 705/14.49 |
| 2012/0044949 A1* | 2/2012 | Velev et al. | 370/401 |
| 2012/0144065 A1* | 6/2012 | Parker et al. | 709/241 |
| 2013/0160024 A1* | 6/2013 | Shtilman et al. | 718/105 |

OTHER PUBLICATIONS

"IBM Migration Factory", Overview, IBM Corporation, http://www-03.ibm.com/systems/migratetoibm/factory/, accessed on Mar. 9, 2012, 2 pages.

"Standard Group MAC Addresses: A Tutorial Guide", IEEE Standards Association, http://standards.ieee.org/develop/regauth/tut/macgrp.pdf, accessed on Mar. 9, 2012, 4 pages.

Gopalan, Kartik et al., "Load Balancing Routing with Bandwidth-Delay Guarantees", IEEE Communications Magazine, vol. 42, Issue 6, Jun. 2004, pp. 108-113.

Levenshtein, V.I., "Binary Codes Capable of Correcting Deletions, Insertions, and Reversals", Soviet Physics Doklady, vol. 10, No. 8. Feb. 1966, pp. 707-710.

Magoutis, K. et al.. "Galapagos Model-driven discovery of end-to-end application-storage relationships in distributed systems", IBM Journal of Research and Development, vol. 52, No. 4/5, Jul./Sep. 2008, pp. 367-377.

Wagner, Robert A. et al., "The String-to-String Correction Problem", Journal of the Association for Computing Machinery, vol. 21, No. 1, Jan. 1974, pp. 168-173.

Zhang, Lianfang et al., "Load Balancing of Multipath Source Routing in Ad Hoc Networks", IEEE International Conference on Communications, 2002, pp. 3197-3201.

* cited by examiner

DETECTING TRANSPARENT NETWORK COMMUNICATION INTERCEPTION APPLIANCES

BACKGROUND

The present application relates generally to an improved data processing apparatus and method and more specifically to mechanisms for detecting transparent network communication interception appliances, such as firewalls and load balancers.

The functionality of appliances such as firewalls and load balancers, when such components are well-built and properly installed, should be very difficult to discover automatically. One reason for this is network security enforcement. In order to thwart malicious activity, firewalls and load balancers should appear to simply be another device (e.g., router or server) in the computing network. Furthermore, legitimate discovery mechanisms use management connections to discover what elements are present in the network. Due to security mechanisms, only authorized clients are permitted to make management connections. In many instances, it may be hard to obtain the credentials to make such secure connections, still leaving firewalls and load balancers hard to detect. Even beyond as it relates to security, firewalls and load balancers behave like a general network components, such as servers or routers, from the viewpoint of discovery mechanisms that may not require security credentials. This is especially true since their unique functionality, especially in the context of data centers, is transparent to end users and are not affected by legitimate discovery techniques.

SUMMARY

In one illustrative embodiment, a method, in a data processing system, is provided for identifying transparent network communication interception appliances in a network topology. The method comprises collecting network configuration data from a plurality of devices in the network topology and analyzing the collected network configuration data using one or more heuristics to identify patterns in the collected network configuration data indicative of the presence of a transparent network communication interception appliance. The method further comprises calculating a confidence measure value based on results of the analysis of the collected network configuration data. Moreover, the method comprises sending a notification of a detected presence of a transparent network communication interception appliance to a computing device in response to the calculated confidence measure value meeting or exceeding at least one threshold value.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for discovering transparent network communication interception appliances, such as firewalls and load balancers. These appliances are referred to herein as transparent network communication interception appliances since the nature of these appliances is to act as an intermediary between the source and target of data communications and thus, they intercept these communications, perform some processing on the communications, e.g., routing, filtering, modification, or the like, and then forward/block the communication. These appliances are referred to as "transparent" herein since the actual nature/configuration of the appliances are transparent to standard discovery mechanisms and appear to be just another common network device without their special purpose being known to standard discovery mechanisms that do not implement the mechanisms of the illustrative embodiments described hereafter.

Detection of the location of transparent network communication interception appliances, such as firewalls and load balancers, in a network infrastructure is of importance to a number of network management operations performed in data networks. For example, such detection may be of particular importance with migration operations, and especially with regard to the migration of managed server clusters, i.e. moving the services, software instances, data, and/or the like from one set of server computing devices to another at a same or different network/geographical location. That is, when migrating a managed server cluster, it is important to migrate the server cluster and its firewalls/load balancers as a single unit. This is because the load balancer acts like a "front end" for the servers and when a server is moved, the load balancers typically need to be reconfigured. For best performance, load balancers and servers should be close to each other. For that reason, they are typically moved together, or at the new data center a new load balancer is established. Thus, it is important to know where the firewalls/load balancers are present in the network infrastructure in order to be able to move them with the managed server cluster with which they are associated. It should be appreciated that is important to identify the locations of firewalls/load balancers, or other transparent network communication interception appliances, for other network management operations as well.

As mentioned previously, however, there are roadblocks to automatically identifying the location of transparent network communication interception appliances such as firewalls and load balancers. The discovery mechanisms utilize management connections to perform their discovery operations and, because of security mechanisms and security issues, such transparent network communication interception appliances do not respond to management discovery requests on these management connections. Consequently, the transparent network communication interception appliances appear to discovery mechanisms to be just another device in the network topology and thus, the discovery mechanisms cannot differentiate which devices are actually transparent network communication interception appliances, such as firewalls or load balancers.

The illustrative embodiments provide mechanisms for identifying transparent network communication interception appliances in a network topology. The illustrative embodiments provide a framework and heuristics for predicting the presence and location of transparent network communication interception appliances, such as firewalls and load balancers, using a non-probe based detection methodology. The mechanisms of the illustrative embodiments look for certain patterns in the network configuration data and application/file data collected from the devices of the network, and matches those patterns to known patterns that are indicative of the presence and/or location of transparent network communication interception appliances. A confidence measure may then be calculated based on the matching of data patterns to determine a level of confidence in the prediction of the presence/location of a transparent network communication interception appliance. Based on the confidence measure, a notification may then be generated and sent to a system administrator, an automated migration mechanism, or the like, to inform the particular entity of the presence/location of a transparent network communication interception appliance.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
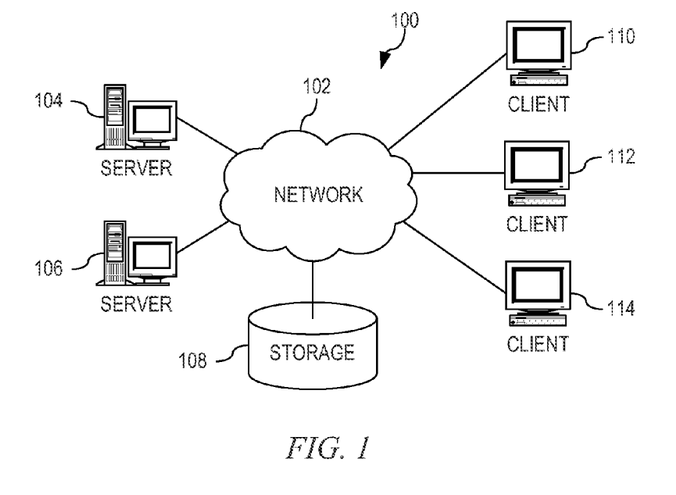
FIG. 1 is an example diagram of a distributed data processing system in which aspects of the illustrative embodiments may be implemented.
Figure 2:
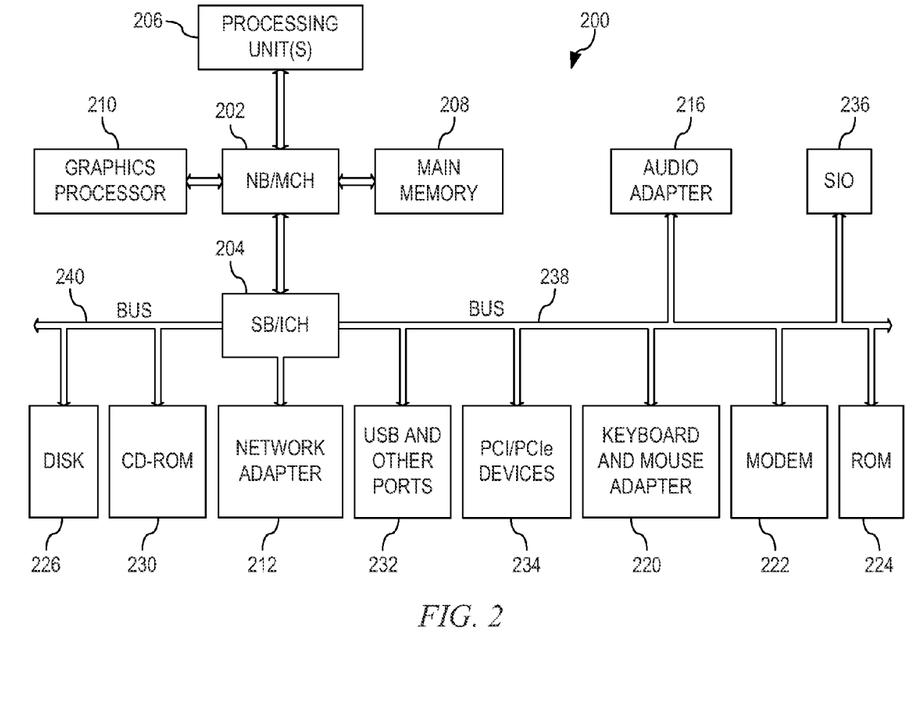
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as FWD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, one or more of the servers 104, 106, or other servers (not shown) in the network 100 may in fact have software/hardware that causes the server 104, 106 to function as a firewall (in the case that the server acts as a gateway device to other computing devices not shown in FIG. 1), load balancer, or other type of transparent network communication interception appliance. Alternatively, other data processing devices, not shown in FIG. 1, such as routers or the like, may have software for implementing firewalls, load balancers, or other types of transparent network communication interception appliance functionality.

For purpose of the following description, it will be assumed that the transparent network communication interception appliance is a load balancer whose purpose it is to balance the load of network communication processing across a plurality of servers by distributing client resource requests over the cluster of resources (e.g., servers, disks, network links, etc.) according to some established policies. Thus, the load balancer has one incoming network address/port for receiving incoming network traffic and maps the incoming network traffic to a plurality of outgoing network addresses/ports, each associated with one or more backend servers or other types of computing devices. Thus, based on the load balancing determinations made by the load balancer, incoming network traffic is redirected to one of these outgoing addresses/ports and thus, to a corresponding server or other computing device for handling. As a result, the incoming load is distributed over these plurality of servers/computing devices to thereby balance the load. Other types of appliances that are not typically discoverable by discovery mechanisms due to their transparent nature, such as firewalls and the like, may likewise be the subject of the detection mechanisms of the illustrative embodiments.

Many operations within a network may be enhanced by knowing whether and where such transparent network communication interception appliances (hereafter using the load balancers as examples of the transparent network communication interception appliances) are located within the network topology. For example, when a data center, set of servers, server clusters, services on servers, applications on servers, or the like, needs to be migrated from one set of servers to another or from one location to another, it is beneficial to migrate the load balancers with the managed resources, e.g., servers, services, applications, etc., as one cohesive unit. Thus, it is beneficial to have a discovery mechanism that is able to identify whether such load balancers are likely present in a network topology, and if possible, identify the location of these load balancers in the network topology. Current discovery mechanisms are not able to perform such operations for the reasons previously discussed above.

In accordance with the mechanisms of the illustrative embodiments, one or more of the servers 104, 106, clients 110-114, or other computing device (not shown), provides hardware/software for implementing a transparent network communication interception appliance (e.g., firewall, load balancer, or the like) detection mechanism. The transparent network communication interception appliance (hereafter "load balancer") detection mechanism analyzes data collected from the various devices of a network topology during a discovery process to identify patterns of data indicative of the presence of a load balancer functionality being present in one or more of the devices. The detection mechanism further calculates a confidence measure based on combinations of results from the pattern analysis that is performed and then provides notifications as to the presence and/or location of load balancers in the network topology. These notifications may then be used to configure migration operations, or other operations, in which presence and location of load balancers is a factor.

Figure 3:
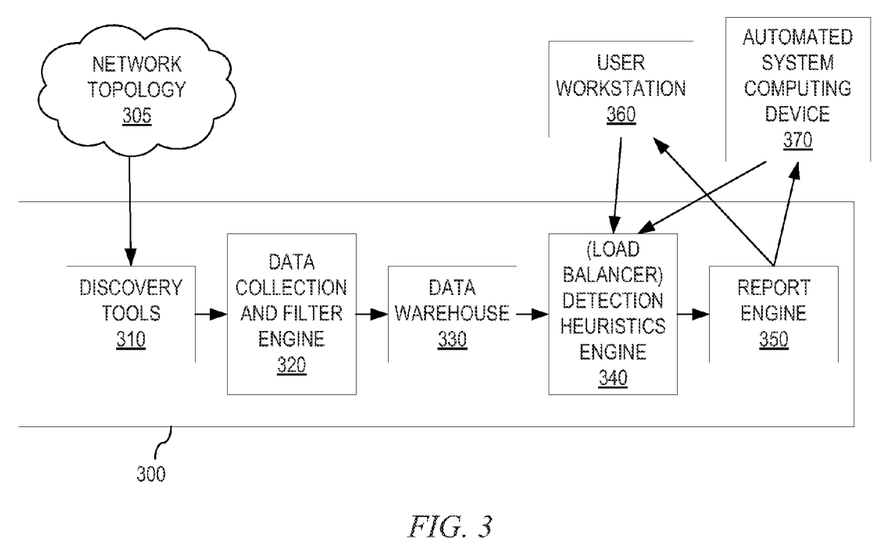
FIG. 3 is an example block diagram of the primary operational elements of a transparent network communication interception appliance (e.g., load balancer) detection mechanism in accordance with one illustrative embodiment.

FIG. 3 is an example block diagram of the primary operational elements of a transparent network communication interception appliance (e.g., load balancer) detection mechanism in accordance with one illustrative embodiment. The elements shown in FIG. 3 may be implemented as hardware, software, or any combination of hardware and software. For example, in one illustrative embodiment, the elements in FIG. 3 may be implemented as software instructions and data executed/processed by one or more data processing devices (e.g., processors, memories, communication hardware such as buses, network interfaces, or the like) of one or more computing devices/systems (e.g., server computing devices, client computing devices, collections of computing devices that together constitute a system, or the like).

As shown in FIG. 3, the load balancer detection mechanism 300 comprises one or more discovery tools 310 that operate to collect data from network devices/appliances in the network topology 305 and provide that data to a data collector and filter engine 320. The data collector and filter engine 320 collects the data from the various devices/appliances in the network topology 305 as obtained by the discovery tools 310, filters the data for data of interest to the discovery mechanism, and stores the filtered data in a data warehouse 330 for further analysis and processing. Load balancer detection heuristics engine 340 then, either continuously, periodically, or in response to an event, such as a user command, automated tool command, or other event, performs analysis on the stored data in the data warehouse 330 using established heuristics to determine the presence and/or location of load balancers within the network topology 305.

The load balancer detection heuristics engine 340 may provide an indication of the detection/non-detection of load balancers in the network topology 305 to a report engine 350 which generates a report data structure that is stored and/or output to authorized user computing devices 360, automated tools 370, or the like. These elements 360, 370 may then utilize the report data structure to perform management operations on the network topology, such as migration operations or the like, and may further provide feedback input to the load balancer detection heuristics engine 340 to modify the heuristics, or parameters utilized by the heuristics, to reflect whether the detection of the presence/location of load balancers was correct or not and modify the operation of the load balancer detection heuristics engine 340 to be more accurate with regard to the detection of the presence/location of load balancers.

As outlined above, the illustrative embodiments utilize discovery tools to obtain network configuration data and/or application/file data from the network devices/appliances of the network topology 305. One example of a discovery tool that may be used to gather such network configuration data and/or application/file data is the SCOPE discovery tool available from International Business Machines (IBM) Corporation of Armonk, N.Y. The SCOPE mechanism uses a combination of network-based probes from Tivoli Application Dependency Detection Manager (TADDM), also available from IBM Corporation, and script libraries that are initiated directly by server administrators or by way of an automated mechanism. The scripts utilized may be local scripts that are executed on the load balancer detection mechanism 300 and/or remote scripts executed on the various devices/appliances of the network topology 305. In addition, Simple Network Management Protocol (SNMP) mechanisms may be used to gather configuration information about the various devices, e.g., routers, switches, servers, workstations, printers, modem racks, etc. that make up the network topology. Other discovery tools 310 that may be utilized include direct connections to network Application Program Interfaces (APIs) of installed middleware, fingerprinting systems such as the open source Network Mapper (NMAP) utility, and the like. It should be noted that while a probe may be used indirectly to obtain information about other devices in the network infrastructure, the illustrative embodiments do not use direct probing of the transparent network communication interception appliance to discover its existence and nature. To the contrary, probes are used in an indirect manner and probing is not necessary, even in an indirect manner, for the functioning of the mechanisms of the illustrative embodiments.

Any type of discovery tool that is capable of obtaining network configuration data from devices of a network topology may be used without departing from the spirit and scope of the illustrative embodiments. However, for purposes of the following description, it will be assumed that local and remote scripts are primarily used to gather configuration information from server computing devices in the network topology since load balancers, firewalls, and other transparent network communication interception appliances are typically hosted or implemented on server computing devices or in association with server computing devices. For instance, Galapagos is a suite of scripts that runs utilities like Unix ifconfig and lsof, then archives the results along with copies of particular configuration files and allows the results to be easily delivered to a discovery mechanism, and imported from there into the SCOPE database. TADDM is configured with access credentials (login or SNMP) for some sets of servers, so that it can connect from the network and do much the same thing as Galapagos. These are only examples of the types of discovery tools that may be used to provide scripting for gathering configuration data from network devices/appliances. Examples of the types of configuration data that may be gathered using the discovery tools 310 and passed through the filtering mechanisms for storage in the data warehouse 330 include, for example, for each device/appliance a list of network interfaces (including loopback devices) that contains Media Access Control (MAC) address, device type, IP address, subnet mask, and default gateway information, a dump of the local Address Resolution Protocol (ARP) cache, or the like. This configuration data may be collected directly from the devices/appliances themselves, or may be collected indirectly from devices coupled to them, e.g., routers, switches, or the like that may have more complete ARP tables. For example, one mechanism for obtaining information indirectly is to use a cluster analysis algorithm that collects a list of all open ports from the servers in the cluster. Some of these ports are open, for example, on every server and so this information does not carry any information (port 135 and 445, for example) and can be filtered out. Other ports, such as smtp port 25, may be identified that are only open on mail servers that are independent of the base operating system. Such configuration information may be obtained from these other devices and analyzed to deduce the presence of transparent network communication interception appliances using the mechanisms of the illustrative embodiments.

SNMP is very useful for collecting information from network appliances. The command line interfaces on network appliances can vary widely between vendors, and SNMP offers a more predictable and standardized interface for gathering configuration information. SNMP version 3 allows user/password authentication, but older SNMP versions rely on knowledge of a "Community String." Particularly because of this history of weak access protection, it is normal to use a white-list to identify which source IP addresses are permitted to access the SNMP interface of a network appliance. Thus, in order to utilize SNMP as one of the discovery tools 310, it may be necessary to establish a white list or community string that permits the SNMP based discovery tools to access and gather the configuration information from the various devices/appliances of the network topology 305.

The scripts, probes, and other discovery tools 310 may gather configuration data from the various devices/appliances of the network topology 305 and return that configuration data to the data collector and filter engine 320. The data collector and filter engine 320 filters the gathered configuration data for configuration data of interest based on established policies of the data collector and filter engine 320 and organizes the filtered data for storage in the data warehouse 330.

The load balancer detection heuristics engine 340 analyzes the data stored in the data warehouse 330 to detect patterns that indicate the existence of devices/appliances that are otherwise difficult to detect under the normal restrictions of a discovery process, e.g., load balancers, firewalls, and other types of transparent network communication interception appliances, in particular load balancers in the example implementation. The nature of these patterns ranges from the configuration of single devices (e.g., server loopback interface configurations) to the distribution of properties across multiple devices (e.g., multiple hosts on a single subnet having different default gateways). Using a combination of such patterns is beneficial for the sake of progressively and efficiently estimating the location of sought-after devices, such as load balancers, firewalls, or the like.

Directly probing transparent network communication interception appliances, such as load balancers and firewalls, is not always feasible for discovery purposes, as discussed above. However, detecting particular patterns among the device configurations may indicate "associations" with load balancers, firewalls, and the like. Specifically, the load balancer detection heuristics engine 340 of the illustrative embodiments uses one or more multi-device heuristics and/or one or more single device heuristics to estimate the probability that a group of hosts are providing resources for one or more load balancers.

Before describing in detail the manner by which the various heuristics may be implemented by the load balancer detection heuristics engine 340, the underlying reasoning for the heuristics will first be described.

Analyzing Subnet Gateway Assignments

Figure 4:
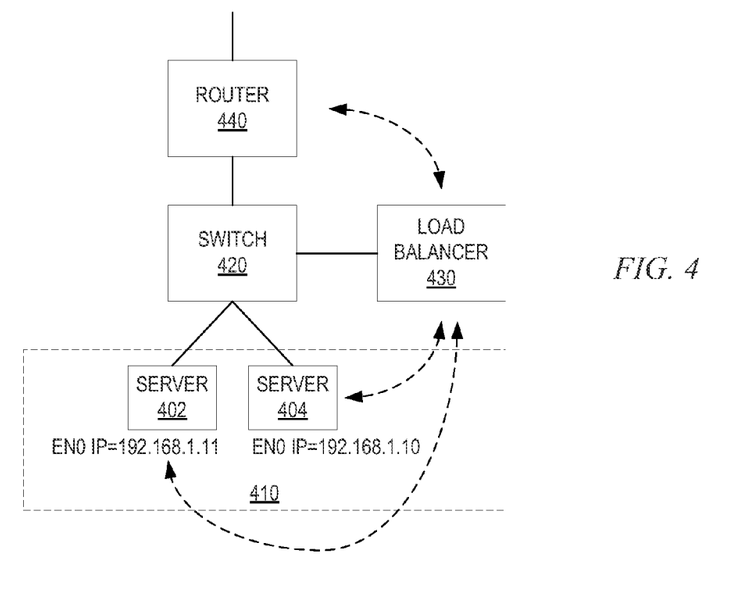
FIG. 4 illustrates a network configuration in which a server cluster (or farm), comprising server computing devices, is connected to a load balancer via a layer 2 switch.

Analyzing the gateway assignments of a group of host systems in the same subnet of the network topology 305 can be helpful for predicting the presence of load balancers or other transparent network communication interception appliances. Enterprise load balancers are usually deployed using any of several conventional network configurations and packet flows. FIG. 4, for example, illustrates a network configuration in which a server cluster (or farm) 410, comprising server computing devices 402 and 404, is connected to a load balancer 420 via a layer 2 switch 430. The server cluster 410 is on a separate network from the router 440. The address of the services provided by the server computing devices 402 and 404 is a virtual IP (VIP) address of the load balancer 430 such that client requests routed via the router 440 utilize the VIP address of the load balancer 430. Once the load balancer 430 receives a request from a client via the router 440, the load balancer 430 uses network address translation (NAT) structures internal to the load balancer 430 to translate the request's destination address to one of the servers 402, 404 in the server cluster 410.

When the requests reach the servers 402, 404, they will have the IP address of the server 402, 404 as destination and the client IP address as source address. Because of this address translation, the server 402, 404 cannot directly send the response packet(s) directly back to the client, since the client expects an answer to come from the original VIP to which the request was sent. Therefore, the server 402, 404 needs to send the packet back to the load balancer 430, which will then reverse the network address translation and send the response packet(s) back to the client which sent the request. To achieve this routing pattern, the load balancer 430 needs to be configured as the default gateway on the servers 402, 404. Other servers on the same subnet that are not load balanced would directly use the subnet router 440 as the default gateway. Thus, if a discovery mechanism is able to identify a subnet with more than one default gateway, this may be indicative of the use of a load balancer, such as load balancer 430.

Distance Based Server Clustering

As well as looking for certain load balancer configurations, such as having multiple default gateways, a more general approach of identifying servers that are likely to be in a cluster with which a load balancer is utilized may be implemented by the load balancer detection mechanisms of the illustrative embodiments. If one can first identify server clusters, one can then investigate the clusters to find the load balancers. In the illustrative embodiments, metrics may be built that indicate configuration similarities such as may be found between servers that provide the same service (via a load balancer). In the extreme case, server clusters consist of identical servers. Where load balancers are used to increase the security and resiliency of services, the server cluster may consist of different hardware and/or software products that provide the same service. However, in most cases, server clusters will run identical (or very similar) hardware and software just to keep administration as simple as possible.

By defining a distance metric between the servers, the illustrative embodiments can identify server clusters, i.e. servers having a relatively smaller distance metric between the servers are more likely to be in a server cluster than other servers having a relatively higher distance metric. A threshold value may further be established for defining a required distance metric level for indicating a server cluster. In one illustrative embodiment, the "distance" metric is determined based on a degree of change in the name associated with a server computing device. That is, an amount of difference in the names of the server computing devices is indicative of the "distance" between the server computing devices. Thus, server computing devices having significantly similar names are likely to be present in the same subnet and thus, the same server cluster.

One example of a mechanism that may be utilized to calculate a distance metric is described in Levenshtein, "Binary Codes Capable of Correcting Deletions, Insertions, and Reversals," Soviet Physics Doklady, Vol. 10, No. 8, (1966), pp. 707-710. Other algorithms, such as the algorithm described in Wagner et al., "The String-to-String Correction Problem," Journal of the ACM, Vol. 21, No. 1, 1974, pp. 168-173, may also be used without departing from the spirit and scope of the illustrative embodiments. These documents are hereby incorporated herein by reference.

Essentially, any algorithm that assigns a distance value based on the amount of "change" needed to go from one string or name to match another string or name may be utilized. Thus, the distance metric measures an amount of difference in the two or more strings/names associated with a server computing device. In one illustrative embodiment, a weighted Levenshtein distance for the server name and/or open port distance, i.e. distance between port numbers of the various server computing devices. That is, the distance between names may be based on the Levenshtein distance, which measures the number of edits required to change one string or name into another string or name. For example, using an example distance algorithm, such as described in Levenshtein and Wagner, for example, the names "Web01" and "Web02" are a distance of 1 apart, whereas "Web01" and "Wef01" are a distance of 2 apart and "Web01" and "Mike01" are a distance of 8 apart. In the first case, the digit-for-digit change has a weighting of 1 and since only 1 character needs to be changed, then the distance is 1. In the second case, the change is letter-for-letter, which has a weighting of 2 and thus, the distance is 2 apart. In the third case, the change is three letter-for-letter replacements and one letter insertion which all have a weighting of 2 and thus, the distance apart is 8.

With the illustrative embodiments, because the illustrative embodiments are looking for name groupings, not typing errors, using the weighted Levenshtein algorithm as an example, inversions are counted (weighted) as two operations (rather than one), and substitutions of a digit for another digit are counted only half as significant as insertions, deletions, or other substitutions. One algorithm for calculated such a weighted Levenshtein distance metric of this type may be to use a modified form of the algorithm described in Wagner et al., "The String-to-String Correction Problem," Journal of the ACM, Vol. 21, No. 1, 1974, pp. 168-173.

The distance between open port lists is calculated separately on the well-known ports (0-1023) and for the rest of the port numbers. The ratio of ports in common to total ports open on the server computing devices is weighted for each group of managed servers, supporting a single service that uses a load balancer to provide a front end (e.g., 80/20 in favor of the general purpose ports, since well-known ports are more likely to be shared between connected computing devices) to produce a distance metric, such as a value between zero and one hundred. That is, within a server cluster, the server computing devices tend to have the same ports open. Thus, if there is a higher ratio of common ports to the total number of ports open on a set of server computing devices, then this is indicative of the server computing devices being present within a same server cluster.

The port distance and server name distance may be combined to generate a metric indicative of the similarity between servers which gives an indication of the possible presence of a load balancer. For example, assume server names "Web1" and "Web2" and "DatabaseHost" all have services on ports 80, while DatabaseHost also has a service on port 50000. The first two servers, "Web 1" and "Web2", are both using a common port, which is not necessarily indicative of the presence of a load balancer in itself, however they also have very similar names (just a digit apart), so they may be working together in a cluster. The third server, "DatabaseHost," has a very different name, and also has a service open on a user-space port that the other two do not have, so it is probably not part of a cluster with the other two. Thus, by looking at the closeness of the names and the ports, the mechanisms of the illustrative embodiments may deduce or predict whether or not a load balancer, or other type of transparent network communication interception appliance, is likely present in association with the server computing devices.

While the server name and port distance properties offer a good first prediction of the presence of load balanced server clusters, other properties that describe machine functions indicative of the presence of a server cluster may also be used. For example, other distance metrics that may be used include directory structure distance, the distance between installed applications and operating systems, and database table (and cardinality) distance (especially if table sizes are large and few other applications are installed).

The above are examples of multi-device heuristics that may be implemented by the load balancer detection heuristics engine 340 to predict the presence and/or location of load balancers in a network topology 305. One or more of these heuristics may be used to generate a relative score or confidence measure of the presence/location of a load balancer with regard to a particular group of devices in the network topology 305. This score or confidence measure may be used to send notifications to indicate whether or not a load balancer is present in the network topology 305 and, if possible, the location of the load balancer.

In addition to the multi-device heuristics, or in the alternative, the load balancer detection heuristics engine 340 may utilize single device heuristics to get information as to the possible presence and location of load balancer sin the network topology 305. For example, these single device heuristics may encompass analyzing server loopback network interfaces and/or analyzing gateway MAC addresses, as described hereafter.

Analyzing Server Loopback Network Interfaces

A loopback interface is a mechanism for routing electronic signals, digital data streams, or flows of data items from their originating facility back to the source without intentional processing or modification. Loopback interfaces can be used for testing the transmission or transportation infrastructure and to perform management operations. In the Internet Protocol version 4 (IPv4), the most common loopback interface has the IP address 127.0.0.1. The loopback interfaces that are not 127.0.0.1 are unusual, but may be found when a load balancer is being used in Direct Routing Mode. In this mode, a load balancer accepts requests from the clients, and forwards them to servers on the same subnet by changing the destination MAC address. The servers have the IP address of the service provided by the servers configured on a loopback interface.

Figure 5:
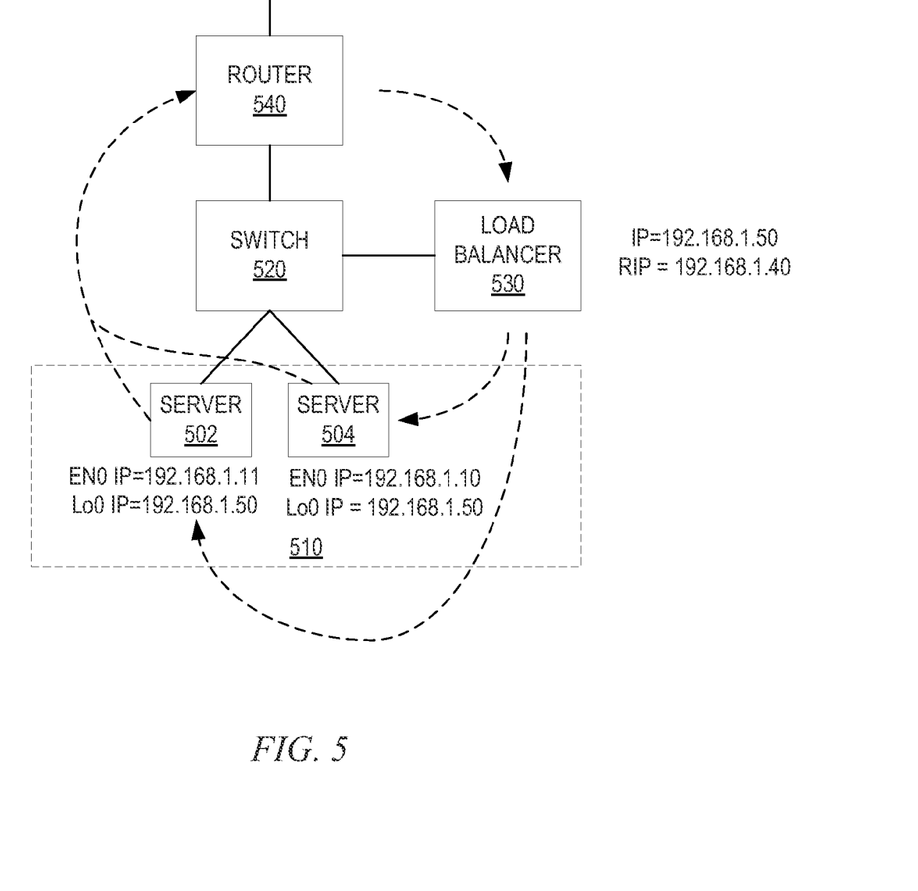
FIG. 5 is an example diagram illustrating servers responding to both a virtual IP address (VIP) and a real IP address (RIP) at the transport layer, but sending Address Resolution Protocol (ARP) responses for the RIP only.

As shown in FIG. 5, servers respond to both the virtual IP address (VIP) and the real IP address (RIP) at the transport layer, but send Address Resolution Protocol (ARP) responses for the RIP only. That is, ARP responses are sent to allow other computing devices in the same broadcast zone (subnet) to map a Media Access Control (MAC) address to an IP address. If two computing devices were to use the same IP address on their physical interfaces, and respond to ARP requests, the network behavior would become undefined (this would be a misconfiguration). All traffic to that address instead, should go to a load balancer, so that the load balancer is the only device that responds to ARP requests. Moreover, in server clusters, by configuring a common address to be on a loopback device, no ARP responses are sent since the loopback device is not connected to any physical network, but the higher level devices are able to recognize the address as local and so they respond to the requests associated with that address. Hence, if these configurations are able to be deduced, such as through the mechanisms of the illustrative embodiments, the presence of load balancers may be predicted accurately.

In FIG. 5, the servers 502 and 504 are configured with RIP addresses 192.168.1.10 and 192.168.1.11, respectively, as well as VIP addresses 192.168.1.50. In FIG. 5, devices having a name of the type "Lo0" are loopback devices in this example. As can be seen from FIG. 5, the servers 502 and 504 of the server cluster 510, coupled to the switch 520, share the same VIP address 192.168.1.50 as that of the server load balancer 530. Thus, when a client request is received via router 540 by the switch 520, the client request is forwarded to the server load balancer 530 based on the VIP, which then sends the client request to both server 502 and 504. The servers 502 and 504 may then send reply packets back to the client via the switch 520 and router 540 since they have the same VIP address from which the client is expecting a response.

With this situation, the network configuration information for the servers 502 and 504, as gathered by the discovery tools 310, may be analyzed to determine if more than one server uses the same, or sufficiently similar, RIP addresses, or utilize loopback addresses not in the 127.0.0.0/8 subnet. That is, all addresses from 127.0.0.1 through 127.255.255.255, i.e. the 127.0.0.0/8 subnet, are currently defined in the IPv4 specification as loopback addresses and thus, to find a loopback device in this range is a normal occurrence. To find a loopback device in any other address range is unusual. The likely explanation for this unusual configuration of a loopback device is to suppress ARP responses to an address while still allowing the address to be used by upper layer devices, which is indicative of a server cluster being present and a corresponding load balancer.

While such analysis may provide an indication of a possible presence/location of a load balancer 530, there may be other reasons such a configuration is used such that this heuristic may give false positive results. To further improve confidence, other patterns, such as looking for similar host/DNS names using a Levenshtein or similar algorithm, for example, comparing the list of running services/open ports to find servers having similar running services and/or open ports, verifying that the servers reside on the same subnet, or the like, may be used. Through a combination of such analysis, a score or confidence measure may be calculated that is indicative of the likelihood that a load balancer is present in the network topology 305 in relation to the servers 502, 504. A weighted approach may be used to calculate a component of the score for each of the characteristics above and the resulting total score may be compared against an established threshold indicative of the minimum score needed to determine that a load balancer is most likely present in the network topology 305 in relation to the servers 502, 504.

Analyzing Gateway MAC Addresses

In addition to, or in the alternative of, the loopback and similar VIP address analysis discussed above, as well as the multi-device heuristic analysis described above, the illustrative embodiments may further analyze the gateway MAC addresses to gather insight into the possible presence/location of load balancers. That is, load balancers are traditionally assigned virtual IP and MAC addresses to support, among other functions, redundancy for failover configurations. Hence, using such information can be helpful in identifying actual load balancer machines, as opposed to the previous heuristics which mainly aim to identify servers connected to load balancers. Since there are no (reliable) means for identifying virtual IP addresses, the illustrative embodiments focus on identifying virtual or locally-administered, MAC addresses as a way of identifying potential load balancers.

Locally administered MAC addresses are either generated by a network administrator or by some internal algorithm of the load balancer itself. Either way, these addresses are different from universally administered addresses (i.e. those containing organizational unique identifiers) in that the second-most significant bit of the most significant byte of the address is set to 1 as opposed to 0. Another convention that is specific to some load balancers is the pattern of the first two significant bytes of the MAC: 02-bf (or 01-bf or 03-bp. Here the first byte indicates the type of load balancer configuration (IGMP, unicast, or multicast) and the second is a placeholder for the priority of the load balanced server handling a client request. While the second MAC pattern should identify a device as being a load balancer, it is not guaranteed that the pattern will always be used. Hence, searching for the first pattern is also helpful, even though it will not guarantee the presence of a load balancer; such patterns in locally administered MACs could be used for other devices such as redundant routers. However, searching for this pattern among the MACs of the host gateways associated with groups of servers as defined by the clustering algorithm described above may help increase the confidence level of load balancer detection. That is, specific ranges of addresses associated with load balancer functionality do not guarantee the presence of a load balancer, but are good indications that one may be present and may be used as a basis for making informed predictions as to the presence of a load balancer.

Multiple IP Addresses Resolving to Same MAC Address

Another indication of the presence of a load balancer is a configuration in which multiple IP addresses resolve to the same MAC address. That is, load balancers often present several services with different IP addresses from the same subnet. For example, a load balancer may present to an external network associated with client computing devices, several services having the following respective IP addresses: IP1=192.168.1.50, IP2=192.168.1.51, IP3=192.168.1.52, IP4=192.168.1.53, IP5=192.168.1.54, . . . . In this case, each service has a different IP address but they are all from the same subnet.

Thus, an additional heuristic that may be utilized by the mechanisms of the illustrative embodiments is to look at the address resolution protocol (ARP) tables on routers and servers of the network topology 305 to identify situations where multiple IP addresses resolve to the same MAC address. Such situations will identify either virtual machine hosts or load balancers. Thus, this heuristic may be used to provide an additional insight into the possible presence/location of a load balancer in the network topology. This heuristic, used alone or in combination with one or more of the other heuristics noted above, may provide a score or confidence measure that can be evaluated to determine if a load balancer is present in the network topology 305 and may even be used to identify the most likely location of the load balancer within the network topology 305.

Returning again to FIG. 3, the load balancer detection heuristics engine 340 uses one or more of the above described heuristics, and/or other heuristics that look at the configuration data collected from devices/appliances in the network topology 305, to identify patterns in the configuration data, such as those described above, that are indicative of the presence/location of a load balancer, or other transparent network communication interception appliance, such as a firewall or the like. The load balancer detection heuristics engine 340 may then generate a score or confidence metric value for portions of the network topology 305, such as for each device/appliance, set of devices/appliances, defined regions of the network topology 305, such as subnets, or the like, which can then be compared to one or more threshold values. The threshold values may be set by a system administrator or other authorized user to be at a level indicative of a minimum confidence required for notification of the presence/location of a load balancer. Based on the comparison of the generated score or confidence metric to the one or more thresholds, the load balance detection heuristics engine 340 determines if a notification that a load balancer has been detected should be sent to the user computing device 360 or automated system 370.

If so, then a notification is generated and sent to the computing devices 360, 370. The notification may comprise a notification that a load balancer is likely to be present, an identification of the portion of the network topology 305 where the load balancer is detected as being most likely present, which may be a region of the network topology 305 or may even be a particular device/appliance in the network topology 305 depending on the granularity to which the heuristic(s) are able to identify the configuration data that indicates the presence of a load balancer. Moreover, the score or confidence metric value may be communicated as well for use by the user and/or automated mechanism of the computing devices 360, 370. The user and/or automated mechanism of the computing devices 360, 370 may then verify whether a load balancer is present in the location/region of the network topology 305 identified by the notification. This may involve manual inspection, automated investigation and analysis mechanisms, or the like. Based on this verification, it can be determined whether the application of the heuristics is generating accurate results. If not, then modifications to the parameters used, heuristics used, or the like, e.g., the weightings being used in the heuristics, the particular combination of heuristics used, etc., may be made via feedback mechanisms.

As a result of the identification of the presence/location of a load balancer, further network management operations may be performed. For example, with regard to migration operations, the location of the load balancer may be used to facilitate migration of the load balancer along with the managed resources associated with the load balancer, e.g., applications, servers, etc., as a single unit is facilitated.

Thus, the illustrative embodiments provide mechanisms for analyzing patterns in network configuration data collected by discovery tools that are indicative of the presence/location of transparent network communication interception appliances, such as load balancers, firewalls, or the like. Based on this analysis, the likelihood of the presence as well as the location of such appliances is calculated and used to send notifications to users/automated mechanisms for use in performing network management operations, such as migration operations or the like.

Figure 6:
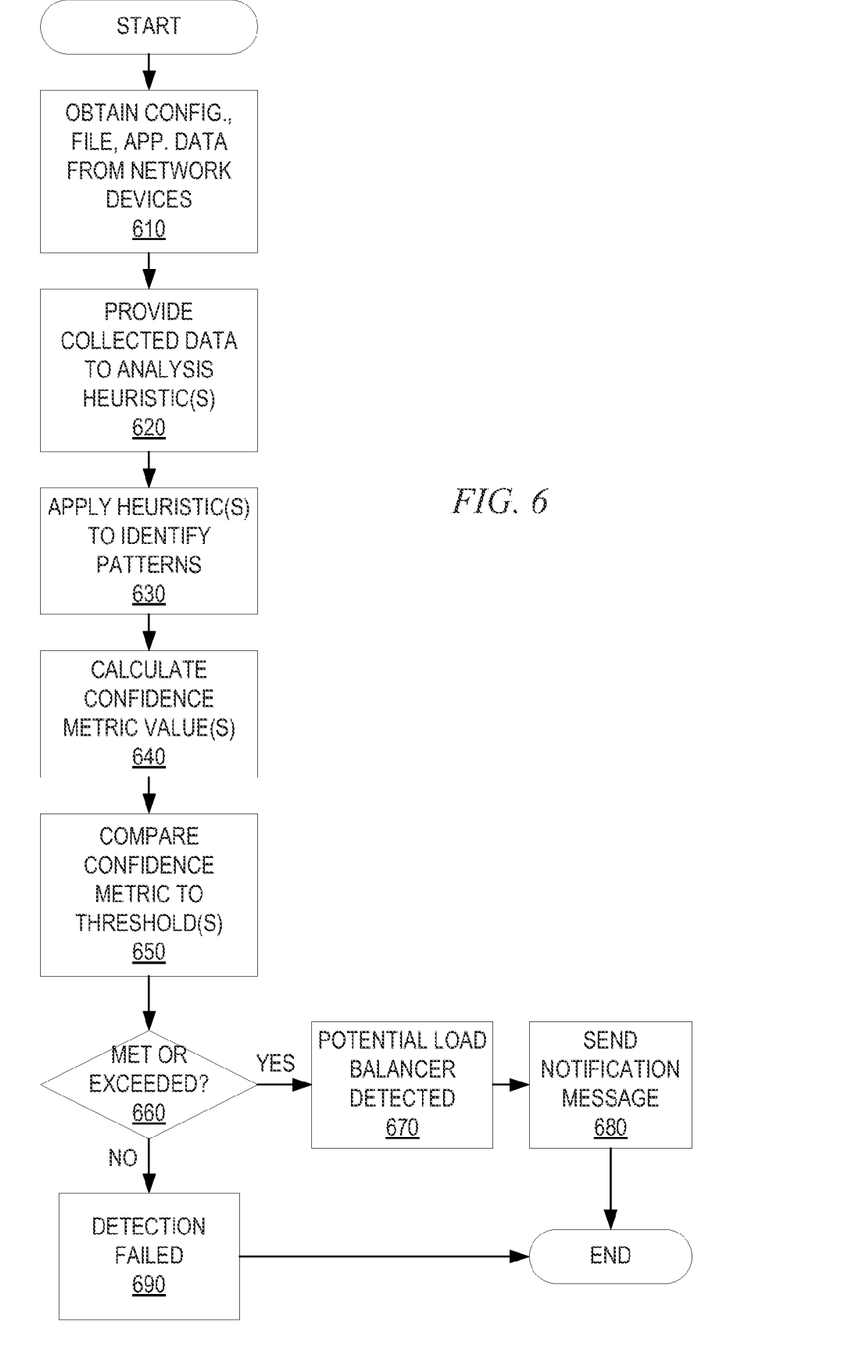
FIG. 6 is a flowchart outlining an example operation of a load balancer detection heuristics engine in accordance with one illustrative embodiment.

FIG. 6 is a flowchart outlining an example operation of a load balancer detection heuristics engine in accordance with one illustrative embodiment. As shown in FIG. 6, the operation starts by obtaining configuration data from devices/appliances of a network topology using one or more discovery tools (step 610). This may involve, for example, collecting subnet devices' network interfaces and default gateway data, subnet devices' file system and application register data, and the like. This information is provided to one or more network configuration analysis heuristics and server property clustering heuristics (step 620) which are applied to the collected network configuration data to identify patterns of configuration data indicative of a presence/location of a load balancer (step 630). These one or more network configuration analysis heuristics and server property clustering heuristics implement one or more of the pattern recognitions described previously. That is, the various patterns of configuration information that are indicative or insightful with regard to the presence of a transparent network communication interception appliance, e.g., load balancer, firewall, or the like, and the analysis logic for identifying these patterns may be implemented in these heuristics and applied to collected data to determine a level to which the collected data matches these patterns, conditions, and the like.

Based on the application of the one or more network configuration analysis heuristics, a confidence metric value is calculated (step 640). The confidence metric value may be a combination of confidence metric values for each of the individual one or more heuristics applied to the network configuration data, for example. These individual confidence metrics may also each be weighted in accordance with a relative importance associated with these heuristics to the overall determination of the presence/location of a load balancer.

The resulting confidence metric may be compared to one or more pre-established thresholds (step 650). If the threshold, one of the thresholds, or a combination of the thresholds, is met or exceeded by the resulting confidence metric (step 660), then a potential load balancer is detected (step 670) and a notification may be generated and sent to an authorized user/automated system (step 680). If the threshold, one or more thresholds, or combination of thresholds is not met or exceeded by the resulting confidence metric, then a detection failure is determined to have occurred (step 690) and no notification is sent. The operation then terminates.

Thus, the illustrative embodiments provide mechanisms for probabilistically identifying computer load balancers, firewalls, or other transparent network communication interception appliances, and computing devices/systems hosting resources that are managed by such appliances. The mechanisms of the illustrative embodiments collect network configuration data from devices/appliances of a network topology, file system and application registry data from these devices/appliances of the network topology, and identifies pre-defined patterns in the collected data. These pre-defined patterns may be multi-device heuristic patterns and/or single device heuristic patterns. Based on the pre-defined patterns, and a degree of matching of the collected data to these pre-defined patterns, a confidence value is calculated that is reflective of the probability that a transparent network communication interception appliance, e.g., load balancer, is present in a designated device/appliance, region, subnet, or the like, is generated. A notification message of the potential load balancer detection with probability as a function of the confidence score is generated if the confidence score meets or exceeds one or more defined thresholds.

The pre-defined patterns in the network configuration data may include the presence of identical IP addresses on multiple hosts and loopback devices configured with any IP addresses not in the 127.0.0.0/8 subnet. Moreover, the pre-defined patterns in network configuration data may include servers that use a different gateway from the rest of their subnet, or a default gateway that is not a router. Furthermore, the pre-defined patterns in network configuration data may include multiple IP addresses that resolve to the same MAC address, as may be revealed in ARP tables from routers and servers, for example.

In addition, in some illustrative embodiments, similar system properties in the file system, application registry data, and open ports of multiple computing devices may be used, alone or in combination with other heuristics, to generate a confidence score. Measuring similarity in system properties in the file system, application registry data, and open ports of multiple computers includes measuring the Levenshtein distance, or other type of distance metric, among the names of machines, measuring the overlap in installed applications (taking versioning into account) among machines, and measuring overlap in open ports among machines wherein common and customer ports are compared different using a weighting scheme.

As previously stated above, it should be appreciated that while the illustrative embodiments are described with regard to the specific implementation for detecting the presence/location of load balancers, the illustrative embodiments are not limited to such. To the contrary, other types of transparent network communication interception appliances, such as firewalls and the like, may be the subject of the operation of the mechanisms of the illustrative embodiments as well. Thus, the invention should not be interpreted to be limited to the detection/location of load balancers but any appliance that is not typically detectable through known discovery tools due to security mechanisms and may otherwise be identified through pattern identification in network configuration data, file and application data, and the like, using the heuristics described above and other similar pattern identification heuristics.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for identifying transparent network communication interception appliances in a network topology, comprising: collecting, by an application detection mechanism in the data processing system, network configuration data from a plurality of devices in the network topology; analyzing, by the appliance detection mechanism, the collected network configuration data using one or more heuristics to identify patterns in the collected network configuration data indicative of the presence of a transparent network communication interception appliance, wherein the appliance detection mechanism is a separate mechanism from the transparent network communication interception appliance; calculating, by the appliance detection mechanism, a confidence measure value based on results of the analysis of the collected network configuration data; and
    sending, by the appliance detection mechanism, a notification of a detected presence of a transparent network communication interception appliance to a computing device in response to the calculated confidence measure value meeting or exceeding at least one threshold value;
    wherein the one or more heuristics comprises a multiple gateway heuristic that analyzes subnet gateway computing device assignment to an associated group of devices, in the plurality of devices in the network topology to identify whether more than one gateway computing device is associated with the group of devices, and wherein calculating the confidence measure value comprises increasing the confidence measure value in response to the multiple gateway heuristic identifying more than one gateway computing device being associated with the group of devices.

2. The method of claim 1, wherein the transparent network communication interception appliance is a load balancer appliance.

3. The method of claim 1, wherein analyzing the collected network configuration data using one or more heuristics to identify patterns in the collected network configuration data comprises:
    calculating, by the appliance detection mechanism, a pattern in the collected network configuration data;
    comparing, by the appliance detection mechanism, the calculated pattern in the collected network configuration data to one or more known patterns indicative of a presence of a transparent network communication interception appliance; and
    determining, by the appliance detection mechanism, if the calculated pattern matches, within a given tolerance, at least one of the one or more known patterns.

4. The method of claim 1, further comprising:
    receiving, by the appliance detection mechanism, feedback input indicative of whether or not results of the analysis and calculation of the confidence measure was accurate; and
    modifying, by the appliance detection mechanism, at least one of the one or more heuristics based on the feedback input.

5. The method of claim 1, wherein the one or more heuristics comprises a distance heuristic that calculates a difference distance between at least one of device names or device communication ports being used by the plurality of devices of the topology network, and compares the difference distance to at least one threshold value, and wherein calculating the confidence measure value comprises increasing the confidence measure value in response to the difference distance being equal to or greater than the at least one threshold value.

6. The method of claim 5, wherein the difference distance is calculated using a weighted difference algorithm that determines an amount of change necessary to change one server name or port assignment of a first device to a server name or port assignment of a second device in the plurality of devices, and weights different types of changes with different weighting values.

7. The method of claim 1, wherein the one or more heuristics comprises a loopback network interface heuristic that determines if a loopback device is present in the network topology and has an associated address that is not within an established range of loopback addresses, and wherein calculating the confidence measure comprises increasing the confidence measure in response to a determination that a loopback device is present in the network topology and has an associated address that is not within an established range of loopback addresses.

8. The method of claim 1, wherein the one or more heuristics comprises a gateway address analysis heuristic that analyzes addresses associated with the devices in the plurality of devices to identify a pattern in the addresses associated with the devices that indicates that an associated device is a transparent network communication interception appliance.

9. The method of claim 8, wherein the pattern in the address is one of a specific setting of a most significant byte of the address to a value indicative of the device being a transparent network communication interception appliance, or a specific setting of the first two significant bytes of the address to a value indicative of the device being a transparent network communication interception appliance.

10. The method of claim 1, wherein the one or more heuristics comprises a multiple address resolution heuristic that determines if one or more address resolution data structures of one or more routers in the plurality of devices of the network topology comprise mappings in which multiple network addresses map to a same device address, and wherein calculating the confidence measure comprises increasing the confidence measure in response to a determination that one or more address resolution data structures of one or more routers in the plurality of devices of the network topology comprise mappings in which multiple network addresses map to a same device address.

11. The method of claim 2, wherein the method is implemented as part of a migration operation for migrating a cluster of server computing devices and the load balancer appliance to a different physical and/or logical location of the network topology.

12. A computer program product comprising a computer readable storage medium having a computer readable program stored therein, wherein the computer readable program, when executed on an appliance detection computing device, causes the computing device to: collect network configuration data from a plurality of devices in a network topology; analyze the collected network configuration data using one or more heuristics to identify patterns in the collected network configuration data indicative of the presence of a transparent network communication interception appliance, wherein the appliance detection computing device is a separate device from the transparent network communication interception appliance; calculate a confidence measure value based on results of the analysis of the collected network configuration data; and send a notification of a detected presence of a transparent network communication interception appliance to a computing device in response to the calculated confidence measure value meeting or exceeding at least one threshold value;
wherein the one or more heuristics comprises a multiple gateway heuristic that analyzes subnet gateway computing device assignment to an associated group of devices, in the plurality of devices in the network topology to identify whether more than one gateway computing device is associated with the group of devices, and wherein calculating the confidence measure value comprises increasing the confidence measure value in response to the multiple gateway heuristic identifying more than one gateway computing device being associated with the group of devices.

13. The computer program product of claim 12, wherein the transparent network communication interception appliance is a load balancer appliance.

14. The computer program product of claim 12, wherein the computer readable program further causes the appliance detection computing device to analyze the collected network configuration data using one or more heuristics to identify patterns in the collected network configuration data by:
calculating a pattern in the collected network configuration data;
comparing the calculated pattern in the collected network configuration data to one or more known patterns indicative of a presence of a transparent network communication interception appliance; and
determining if the calculated pattern matches, within a given tolerance, at least one of the one or more known patterns.

15. The computer program product of claim 12, wherein the computer readable program further causes the appliance detection computing device to:
receive feedback input indicative of whether or not results of the analysis and calculation of the confidence measure was accurate; and
modify at least one of the one or more heuristics based on the feedback input.

16. The computer program product of claim 12, wherein the one or more heuristics comprises a distance heuristic that calculates a difference distance between at least one of device names or device communication ports being used by the plurality of devices of the topology network, and compares the difference distance to at least one threshold value, and wherein calculating the confidence measure value comprises increasing the confidence measure value in response to the difference distance being equal to or greater than the at least one threshold value.

17. The computer program product of claim 16, wherein the difference distance is calculated using a weighted difference algorithm that determines an amount of change necessary to change one server name or port assignment of a first device to a server name or port assignment of a second device in the plurality of devices, and weights different types of changes with different weighting values.

18. The computer program product of claim 12, wherein the one or more heuristics comprises a loopback network interface heuristic that determines if a loopback device is present in the network topology and has an associated address that is not within an established range of loopback addresses, and wherein calculating the confidence measure comprises increasing the confidence measure in response to a determination that a loopback device is present in the network topology and has an associated address that is not within an established range of loopback addresses.

19. The computer program product of claim 12, wherein the one or more heuristics comprises a gateway address analysis heuristic that analyzes addresses associated with the devices in the plurality of devices to identify a pattern in the addresses associated with the devices that indicates that an associated device is a transparent network communication interception appliance.

20. The computer program product of claim 19, wherein the pattern in the address is one of a specific setting of a most significant byte of the address to a value indicative of the device being a transparent network communication interception appliance, or a specific setting of the first two significant bytes of the address to a value indicative of the device being a transparent network communication interception appliance.

21. The computer program product of claim 12, wherein the one or more heuristics comprises a multiple address resolution heuristic that determines if one or more address resolution data structures of one or more routers in the plurality of devices of the network topology comprise mappings in which multiple network addresses map to a same device address, and wherein calculating the confidence measure comprises increasing the confidence measure in response to a determination that one or more address resolution data structures of one or more routers in the plurality of devices of the network topology comprise mappings in which multiple network addresses map to a same device address.

22. The computer program product of claim 13, wherein the computer readable program is executed as part of a migration operation for migrating a cluster of server computing devices and the load balancer appliance to a different physical and/or logical location of the network topology.

23. An appliance detection apparatus, comprising: a processor; and a memory coupled to the processor, wherein the memory comprises instructions which, when executed by the processor, cause the processor to: collect network configuration data from a plurality of devices in a network topology; analyze the collected network configuration data using one or more heuristics to identify patterns in the collected network configuration data indicative of the presence of a transparent network communication interception appliance, wherein the appliance detection apparatus is a separate apparatus from the transparent network communication interception appliance; calculate a confidence measure value based on results of the analysis of the collected network configuration data; and send a notification of a detected presence of a transparent network communication interception appliance to a computing device in response to the calculated confidence measure value meeting or exceeding at least one threshold value;

wherein the one or more heuristics comprises a multiple gateway heuristic that analyzes subnet gateway computing device assignment to an associated group of devices, in the plurality of devices in the network topology to identify whether more than one gateway computing device is associated with the group of devices, and wherein calculating the confidence measure value comprises increasing the confidence measure value in response to the multiple gateway heuristic identifying more than one gateway computing device being associated with the group of devices.

* * * * *